(12) United States Patent
Liu et al.

(10) Patent No.: US 12,050,009 B2
(45) Date of Patent: Jul. 30, 2024

(54) LOW NITROGEN COUPLING COMBUSTION SYSTEM FOR THE DISPOSAL OF WASTE STINK GAS AND SOLID WASTE

(71) Applicants: GUANGDONG UNIVERSITY OF TECHNOLOGY, Guangzhou (CN); Guangzhou Herui Energy Conservation and Environmental Protection Technology Co., Ltd., Guangzhou (CN)

(72) Inventors: Xiaozhou Liu, Guangzhou (CN); Peibin Lin, Guangzhou (GD); Wei Liu, Guangzhou (GD); Longbiao Dong, Guangzhou (CN); Yu Zhang, Guangzhou (CN)

(73) Assignees: GUANGDONG UNIVERSITY OF TECHNOLOGY, Guangzhou (CN); Guangzhou Herui Energy Conservation and Environmental Protection Technology Co., Ltd., Guangzhou (CN)

( * ) Notice: Subject to any disclaimer, the term of this patent is extended or adjusted under 35 U.S.C. 154(b) by 468 days.

(21) Appl. No.: 17/525,945

(22) Filed: Nov. 14, 2021

(65) Prior Publication Data
US 2022/0146095 A1 May 12, 2022

Related U.S. Application Data

(63) Continuation of application No. PCT/CN2020/131583, filed on Dec. 29, 2020.

(30) Foreign Application Priority Data

Nov. 9, 2020 (CN) .......................... 202011241960.9

(51) Int. Cl.
*F23G 5/12* (2006.01)
*F01D 13/00* (2006.01)
(Continued)

(52) U.S. Cl.
CPC ............... *F23G 5/12* (2013.01); *F01D 13/00* (2013.01); *F01D 25/08* (2013.01); *F01N 5/02* (2013.01);
(Continued)

(58) Field of Classification Search
CPC ..... F23G 5/12; F23G 5/46; F23G 7/06; F23G 2206/10; F23G 2206/20; F23G 7/066;
(Continued)

(56) References Cited

U.S. PATENT DOCUMENTS

2002/0006593 A1* 1/2002 Okazaki ............... B01D 53/343
432/187
2005/0166810 A1* 8/2005 Gnedenko ................. F23G 5/16
110/342
(Continued)

FOREIGN PATENT DOCUMENTS

CN 101539296 A 9/2009
CN 201396766 Y 2/2010
(Continued)

OTHER PUBLICATIONS

Internation Search Report of PCT/CN2020/131583, Mailed Aug. 5, 2021.

*Primary Examiner* — J. Todd Newton

(57) ABSTRACT

A low nitrogen coupling combustion system for the disposal of waste stink gas and solid waste, including a waste pit, at least one stink gas incineration equipment and a waste incinerator, wherein the waste pit is equipped with stink gas outlets and the stink gas incineration equipment is provided with an incineration chamber for burning stink gas, as well (Continued)

as a stink gas inlet, a fuel inlet and a burned stink gas outlet which are connected with the incineration chamber; the stink gas inlet is connected with the stink gas outlet of the waste pit through a stink gas delivery pipe, and the fuel inlet is connected with a fuel source through a fuel delivery pipe; the burned stink gas outlet is connected with a combustion-supporting air inlet of the waste incinerator through a flue gas discharge pipe.

9 Claims, 3 Drawing Sheets

(51) Int. Cl.
| | | |
|---|---|---|
| *F01D 25/08* | (2006.01) | |
| *F01N 5/02* | (2006.01) | |
| *F01N 5/04* | (2006.01) | |
| *F23C 9/08* | (2006.01) | |
| *F23G 5/46* | (2006.01) | |
| *F23G 7/06* | (2006.01) | |
| *F25B 27/02* | (2006.01) | |

(52) U.S. Cl.
CPC .............. *F01N 5/04* (2013.01); *F23C 9/08* (2013.01); *F23G 5/46* (2013.01); *F23G 7/06* (2013.01); *F05D 2220/31* (2013.01); *F05D 2260/20* (2013.01); *F23G 2206/10* (2013.01); *F23G 2206/20* (2013.01); *F25B 27/02* (2013.01)

(58) Field of Classification Search
CPC . F01D 13/00; F01D 25/08; F01N 5/02; F01N 5/04; F23C 9/08; F05D 2220/31; F05D 2260/20; F25B 27/02; F25B 27/007
See application file for complete search history.

(56) References Cited

U.S. PATENT DOCUMENTS

| | | | |
|---|---|---|---|
| 2013/0232939 A1* | 9/2013 | Armstrong | B01J 8/062 60/39.23 |
| 2013/0232940 A1* | 9/2013 | Armstrong | F23G 7/066 60/39.23 |
| 2013/0232942 A1* | 9/2013 | Watts | F23C 9/00 60/39.461 |
| 2013/0232943 A1* | 9/2013 | Lampe | F02C 3/205 60/39.465 |
| 2013/0232985 A1* | 9/2013 | Hamrin | F23N 5/00 431/2 |
| 2013/0236840 A1* | 9/2013 | Maslov | F23N 5/003 431/11 |
| 2013/0236841 A1* | 9/2013 | Armstrong | F23C 9/00 431/12 |
| 2013/0236845 A1* | 9/2013 | Hamrin | F22B 1/18 432/19 |
| 2022/0146094 A1* | 5/2022 | Liu | F26B 5/04 |
| 2022/0146095 A1* | 5/2022 | Liu | F23G 5/12 |

FOREIGN PATENT DOCUMENTS

| | | |
|---|---|---|
| CN | 105387472 A | 3/2016 |
| CN | 206924608 U | 1/2018 |
| CN | 206944178 U | 1/2018 |
| CN | 109695888 A | 4/2019 |
| JP | 09236220 A | 9/1997 |
| JP | 2000249324 A | 9/2000 |

\* cited by examiner

LOW NITROGEN COUPLING COMBUSTION SYSTEM FOR THE DISPOSAL OF WASTE STINK GAS AND SOLID WASTE

CROSS-REFERENCE TO RELATED APPLICATIONS

This application is a continuation of International Patent Application No. PCT/CN2020/131583 with a filing date of Dec. 29, 2020, designating the United States, now pending, and further claims priority to Chinese Patent Application No. 202011241960.9 with a filing date of Nov. 9, 2020. The content of the aforementioned applications, including any intervening amendments thereto, are incorporated herein by reference.

TECHNICAL FIELD

The present disclosure relates to a disposal system of waste and more particularly, relates to a low nitrogen coupling combustion system for the disposal of waste stink gas and solid waste which can treat stink gas, prevent coking of waste incineration and save energy.

BACKGROUND

With the continuous increase of population, the acceleration of urbanization and the improvement of living standards, the amount of urban waste has increased rapidly in recent years. There are three main ways of harmless disposal of urban waste in China: landfill, incineration and composting. Domestic waste treatment in China is mainly landfill, and the proportion of incineration and composting is small, but the proportion of incineration is increasing every year. Compared with landfill, incineration has the advantages of volume reduction, mass reduction and energy reuse. If we continue to focus on landfill, more cities will be surrounded by waste in the near future, which forces China to speed up the construction of waste incineration plants.

The waste disposed in the municipal solid waste incineration plant will be stacked, stored and dried before incineration, so a certain amount of landfill leachate will be produced. Landfill leachate is a kind of high concentration organic wastewater with complex components. It is recognized as one of the most difficult wastewater to meet the standard in the world. The typical characteristics of landfill leachate are high concentration of BOD and COD, high concentration of heavy metals, large change of water quality and quantity, high content of ammonia nitrogen and imbalance of microbial nutrition. It is not only extremely stinky, but also the relevant indicators are 10-100 times that of general urban sewage. If the domestic waste leachate is directly discharged into the environment, it will cause serious pollution to the surrounding soil as well as water body and the plants cannot grow wherever the waste leachate goes.

During the incineration of municipal solid waste, fly ash with high content of dioxins and heavy metals will settle in the discharged gas purification equipment. According to the "Pollution control standard for domestic waste landfill of China (GB168892008)", domestic waste incineration fly ash is a hazardous waste. At the same time, the landfill requirements are that the moisture content efficiency of domestic waste incineration fly ash is less than 30%, the dioxin content is less than 3 ugTEQ/Kg, and the leaching toxicity of heavy metals is lower than the corresponding standard value. In particular, dioxins (PCDD/Fs) are collectively referred to as polychlorinated dibenzo dioxins (PCDDs) and polychlorinated dibenzofurans (PCDFs). It is recognized as "the most toxic substance in the world", and the greatest harm is irreversible "three causing" toxicity, namely teratogenicity, carcinogenesis and Mutagenicity; Once it enters the organism, it accumulates in the fat layer and organs of the organism and can hardly be discharged or degraded, resulting in cumulative poisoning, which seriously affects the surrounding ecological environment.

In addition, in the process of organic waste fermentation, the waste pit storing waste produces a large amount of organic waste gas, which is fetid and seriously pollutes the surrounding environment. The existing treatment method of organic waste gas from the waste pit is shown in FIG. 1. The waste gas from the waste pit is heated to about 220° C. by absorbing heat through the heat exchanger and is introduced into the waste incinerator for combustion. The 300° C. steam generated by the waste incinerator is used as the heat source of the heat exchanger. Such a treatment mode has serious defects. Waste gas is easy to leak and pollute the surrounding environment which affects the lives of surrounding residents. In addition, the incineration process of organic waste gas needs energy and could not save cost. The waste incinerator burns waste at relatively low temperature, resulting in ash accumulation and coking on the furnace wall, which affects the service life and incineration efficiency of the waste incinerator.

SUMMARY

The objective of the current disclosure is to provide a low nitrogen coupling combustion system for the disposal of waste stink gas and solid waste, which can effectively treat the stink gas from the waste pit, reduce the coking of the waste incinerator, and save energy.

To realize the above objectives, the present disclosure provides a low nitrogen coupling combustion system for the disposal of waste stink gas and solid waste, including a waste pit, at least one stink gas incineration equipment and a waste incinerator, wherein the waste pit is provided with stink gas outlets; and the stink gas incineration equipment is provided with an incineration chamber for burning stink gas, as well as a first stink gas inlet, a fuel inlet and a burned stink gas outlet which are connected with the incineration chamber; the first stink gas inlet is connected with the stink gas outlet of the waste pit through a stink gas delivery pipe, and the fuel inlet is connected with a fuel source through a fuel delivery pipe; the burned stink gas outlet is connected with a combustion-supporting air inlet of the waste incinerator through a flue gas discharge pipe, thus the high temperature and low oxygen flue gas discharged by the stink gas incineration equipment is led into the waste incinerator and used as the combustion-supporting air of the waste incinerator.

Optionally, a hot air pipe is arranged between the stink gas incineration equipment and the waste incinerator, and the hot air pipe is provided with a gas inlet, a first exhaust outlet and a second exhaust outlet; wherein, the gas inlet is connected with the stink gas incineration equipment; the first exhaust outlet is connected with a chimney through a first exhaust pipe, and the first exhaust pipe is provided with a valve; the second exhaust outlet is connected with the combustion-supporting air inlet of the waste incinerator through a second exhaust pipe so that a high-temperature and low oxygen flue gas discharged by the stink gas incineration equipment can be used as a combustion-supporting air of the waste incinerator.

Optionally, the hot air pipe is also provided with a regulating air inlet, and a fan is connected at the regulating air inlet to introduce air and adjust the temperature of flue gas and oxygen content, so that the flue gas temperature is controlled at about 220° C. and the oxygen content is controlled at about 15-18%, which can effectively reduce the quantity of nitrogen oxides discharged from the waste incinerator and prevent coking of waste in waste incinerator.

Optionally, a first heat exchanger is arranged between the stink gas incineration equipment and the hot air pipe, the first heat exchanger is provided with a high-temperature gas inlet, a medium-temperature gas outlet, a second stink gas inlet and a stink gas discharge outlet; the stink gas incineration equipment is also provided with an inlet of stink gas branch pipe; the high-temperature gas inlet is connected with the burned stink gas outlet of the stink gas incineration equipment; the medium-temperature gas outlet is connected with the gas inlet of the hot air pipe; the second stink gas inlet is connected with the stink gas outlet of the waste pit through the stink gas branch pipe. In this way, part of the stink gas is led into the first heat exchanger. In the first heat exchanger, the part of the stink gas is heated into hot stink gas with a temperature of more than 500° C. by the flue gas up to 800° C. generated by the stink gas incineration equipment. Then, the hot stink gas is introduced into the stink gas incineration equipment and burns with the fuel.

Preferably, the stink gas delivery pipe is provided with a main valve, and the stink gas branch pipe is provided with an auxiliary valve. When the system starts to operate, the main valve is opened and the auxiliary valve is closed. After the system being operated for a period of time, the main valve is closed and the auxiliary valve is opened. If there is a failure in the stink gas branch pipe and needs maintenance, the auxiliary valve is closed and the main valve is opened. At this time, the stink gas will be burned directly without being heated. Although some energy will be wasted, the system can still be operated normally without shutdown.

Optionally, the low nitrogen coupling combustion system for the disposal of waste stink gas and solid waste includes at least two stink gas incineration equipment which can be switched during use. When one stink gas incineration equipment is damaged or needs to be repaired, the other stink gas incineration equipment can be switched for operation, so that the waste gas can be treated continuously to reduce the risk of pollution and leakage of the stink gas.

Optionally, the low nitrogen coupling combustion system for the disposal of waste stink gas and solid waste includes three stink gas incineration equipment. During operation, two stink gas incineration equipment are in operation and the third one is in standby.

Optionally, the low nitrogen coupling combustion system for the disposal of waste stink gas and solid waste further includes a second heat exchanger; the second heat exchanger comprises a cold air inlet, a hot air outlet, a hot steam inlet, and a condensate water outlet; the hot air pipe is provided with an air inlet, the air inlet is connected with the hot air outlet of the second heat exchanger, and the hot steam inlet of the second heat exchanger is connected with a steam turbine steam exhaust system. In this way, the second heat exchanger uses the waste heat of the exhaust steam of the steam turbine to preheat the air, and then the hot air enters the hot air pipe to mix with the flue gas.

Optionally, the steam turbine steam exhaust system includes a steam turbine, a deaerator and a steam-distributing cylinder connected in sequence, and the outlet of the steam-distributing cylinder is connected with the hot steam inlet of the second heat exchanger.

Optionally, the steam-distributing cylinder is provided with a branch outlet; the branch outlet is connected with the inlet of an absorption refrigeration system, so that part of the heat is used for refrigeration, and the generated cold air is used for the office area of the production workshop; the outlet of the absorption refrigeration system is connected with the inlet of the deaerator through a condensate water pipe, so that the high-temperature condensate water formed after refrigeration returns to the deaerator through the condensate pipe.

Optionally, the low nitrogen coupling combustion system for the disposal of waste stink gas and solid waste further comprises a third heat exchanger; the third heat exchanger comprises a hot flue gas inlet, a cold flue gas outlet, a cold water inlet and a steam outlet; the hot flue gas inlet is connected with the steam outlet of the waste incinerator; the cold flue gas outlet is connected with the chimney; the cold water inlet is connected with a cold water source; a steam pipe is arranged at the steam outlet; the steam outlet is connected with the hot steam inlet of the steam turbine of the steam turbine steam exhaust system through a steam pipe.

The present disclosure has the following beneficial technical effects: (1) Pollution reduction: the stink gas discharged from the waste pit can be completely disposed to avoid leakage and environmental pollution; (2) Energy saving: waste heat can be fully recycled to effectively save energy consumption; (3) Low operation cost: the waste heat discharged is recycled, transformation and operation management of the disposal system are simple, and the cost is low; (4) The high temperature and low oxygen flue gas discharged by the stink gas incineration equipment is used as the combustion-supporting air of the waste incinerator, so that the waste incineration can be carried out in the high-temperature and low-oxygen condition, which can effectively reduce the generation of nitrogen oxides, so as to greatly prevent the coking phenomenon of the waste incinerator, improve the combustion efficiency and prolong the service life.

DETAILED DESCRIPTION OF PREFERRED EMBODIMENTS

Figure 1:
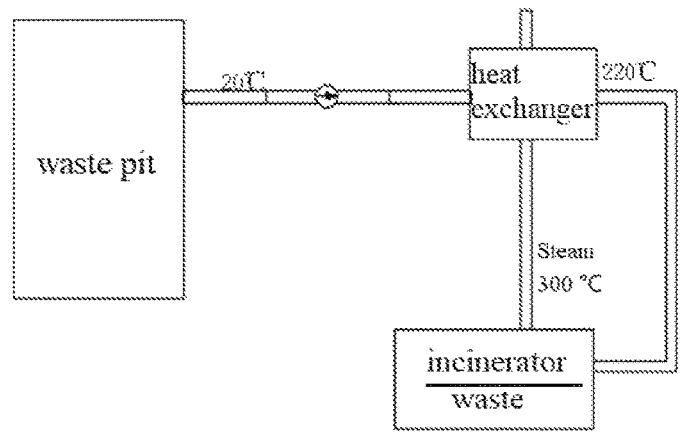
FIG. 1 is a structural schematic diagram of a waste pit stink gas treatment system in the prior art.

The present disclosure will be described in detail below with reference to the drawings and specific embodiments. The drawings show the specific structure of the preferred embodiment of the present disclosure. The structure of each component is described by reference to the structure shown in FIG. 1, if orientations (up, down, left, right, front and back) is involved, but the actual use direction of the present disclosure is not limited to that.

Figure 2:
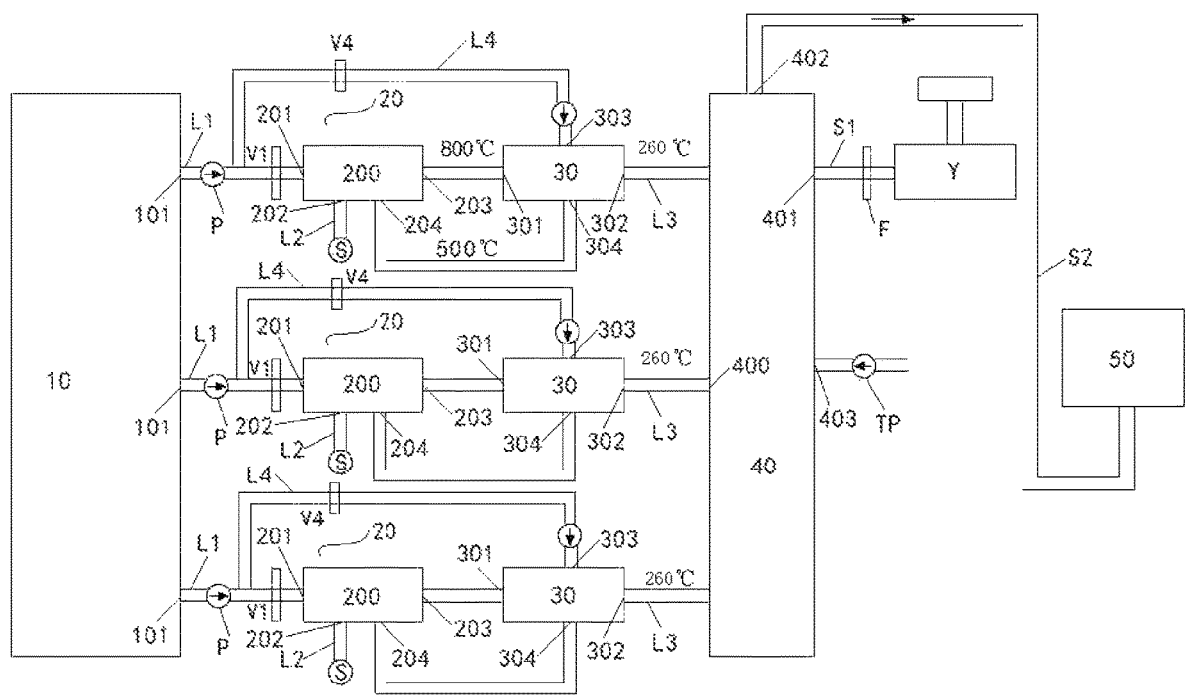
FIG. 2 is a structural schematic diagram of a first embodiment of a low nitrogen coupling combustion system for the disposal of waste stink gas and solid waste according to the present disclosure.

Reference is made to FIG. 2, as a non-limiting embodiment of the present disclosure, a low nitrogen coupling combustion system for the disposal of waste stink gas and solid waste includes a waste pit 10, three stink gas incineration equipment 20, three heat exchangers 30, a hot air pipe 40, and a waste incinerator 50.

The waste pit 10 is provided with a stink gas outlet 101, and the stink gas incineration equipment 20 includes an incineration chamber 200 for burning stink gas, a first stink gas inlet 201 connected with the incineration chamber 200, a fuel inlet 202, and a burned stink gas outlet 203.

The stink gas outlet 101 of the waste pit 10 is connected with the first stink gas inlet 201 of the stink gas incineration equipment 20 through a stink gas delivery pipe L1, and the stink gas delivery pipe L1 is provided with an exhaust fan P, so as to achieve the effect of sucking the stink gas in the waste pit 10 into the stink gas incineration equipment 20 for combustion.

The fuel inlet 202 of the stink gas incineration equipment 20 is connected with a fuel source S through a fuel delivery pipe L2. The fuel source S is natural gas, which has the advantages of high calorific value and low pollution. The fuel is mixed with a heated stink gas and burned at high temperature in the incineration chamber 200 for effective incineration disposal of the stink gas, so that the stink gas no longer pollutes the environment and can generate heat for utilization.

The burned stink gas outlet 203 of the stink gas incineration equipment 20 is connected with the hot air pipe 40 through a flue gas discharge pipe L3, so as to discharge the high-temperature and low-oxygen flue gas generated by the mixed combustion of fuel and stink gas into the hot air pipe. The hot air pipe 40 is provided with a gas inlet 400, a first exhaust outlet 401 and a second exhaust outlet 402. As shown in FIG. 2, the gas inlet 400 is connected with the burned stink gas outlet 203 of the stink gas incineration equipment 20. The first exhaust outlet 401 is connected with a chimney Y through the first exhaust pipe S1, and the first exhaust pipe S1 is provided with a valve F, so that the flue gas can be directly discharged through the chimney Y when the waste incinerator 50 does not need combustion-supporting air.

The hot air pipe 40 is connected with a combustion-supporting air inlet (not shown in the drawings) of the waste incinerator 50 through a second exhaust pipe S2. The high-temperature and low-oxygen flue gas discharged by the stink gas incineration equipment 20 is used as the combustion-supporting air of the waste incinerator 50, so that the waste incineration can be carried out in a high-temperature (not exceeding the upper limit temperature of the waste incinerator) and low-oxygen condition, which can effectively reduce the production of nitrogen oxides and carbon monoxide, so as to greatly prevent the coking of waste incinerator, improve combustion efficiency and prolong the service life of incinerator body.

The hot air pipe 40 is also provided with a regulating air inlet 403, and a regulating fan TP is connected at the regulating air inlet 403 to introduce air and regulate the temperature and oxygen content of the flue gas, so that the flue gas temperature is controlled at about 220° C. and the oxygen content is controlled at about 15-18%, which can effectively reduce the generation of nitrogen oxides in the waste incinerator and prevent coking at the same time.

In this non-limiting embodiment, as shown in FIG. 2, a first heat exchanger 30 is arranged between the stink gas incineration equipment 20 and the hot air pipe 40, the first heat exchanger 30 is provided with a high-temperature gas inlet 301, a medium-temperature gas outlet 302, a second stink gas inlet 303, and a stink gas discharge outlet 304. In addition, the stink gas incineration equipment 20 is also provided with a stink gas branch inlet 204.

The high-temperature gas inlet 301 of the first heat exchanger 30 is connected with the burned stink gas outlet 203 of the stink gas incineration equipment 20, the medium-temperature gas outlet 302 is connected with the air inlet 400 of the hot air pipe 40, the second stink gas inlet 303 is connected with the stink gas outlet 101 of the waste pit 10 through a stink gas branch pipe L4, and the stink gas discharge outlet 304 is connected with the stink gas branch inlet 204 of the stink gas incineration equipment 20 through pipe. In this way, the stink gas in the waste pit 10 is introduced into the first heat exchanger 30 and is heated into hot gas with a temperature of more than 500° C. by the waste flue gas up to 800° C. generated by the stink gas incineration equipment 20. Then the hot gas is introduced into the incineration chamber 200 for mixed combustion with the fuel. The stink gas is heated and then burned, which can not only save energy, but also improve the combustion efficiency of the stink gas incineration equipment 20 and reduce the external fuel consumption of the stink gas incineration equipment 20 to achieve the purpose of recycling most of the waste heat of waste gas.

In addition, valve V1 is set on the stink gas delivery pipe L1 and valve V4 is set on the stink gas branch pipe L4. When the system starts to operate, the valve V1 is opened and the valve v4 is closed. After the system operates for a period of time, the valve V1 is closed and the valve v4 is opened. If the stink gas branch pipe L4 has problems and needs maintenance, the valve V4 is closed and the valve V1 is opened. At this time, the stink gas will be burnt directly without heating. Although some energy will be wasted, the system can still operate normally without shutdown.

In this non-limiting embodiment, more than two stink gas incineration equipment 20 are set for switching use when in operation. When one stink gas incineration equipment is damaged or needs to be repaired, the other stink gas incineration equipment can be switched for operation, so that the waste gas can be treated continuously to reduce the risk of pollution and leakage of the stink gas.

In the disclosure, there are three stink gas incineration equipment 20 and the heat exchanger 30 is arranged between each stink gas incineration equipment 20 and the hot air pipe 40. Three stink gas outlets 101 are arranged on the waste pit 10 which are respectively connected with the three heat exchangers 30 by setting stink gas branch pipes L4, and the stink gas discharge outlet 304 of each heat exchanger 30 is connected with the fuel inlet 202 of the corresponding stink gas incineration equipment 20 through pipelines. Therefore, during the operation of the whole system, two stink gas incineration mechanisms 20 can be in operation and the third one is on standby, which can ensure complete stink gas treatment, minimize pollution, and provide sufficient low oxygen and high temperature waste gas for combustion-supporting of waste incinerator.

Figure 3:
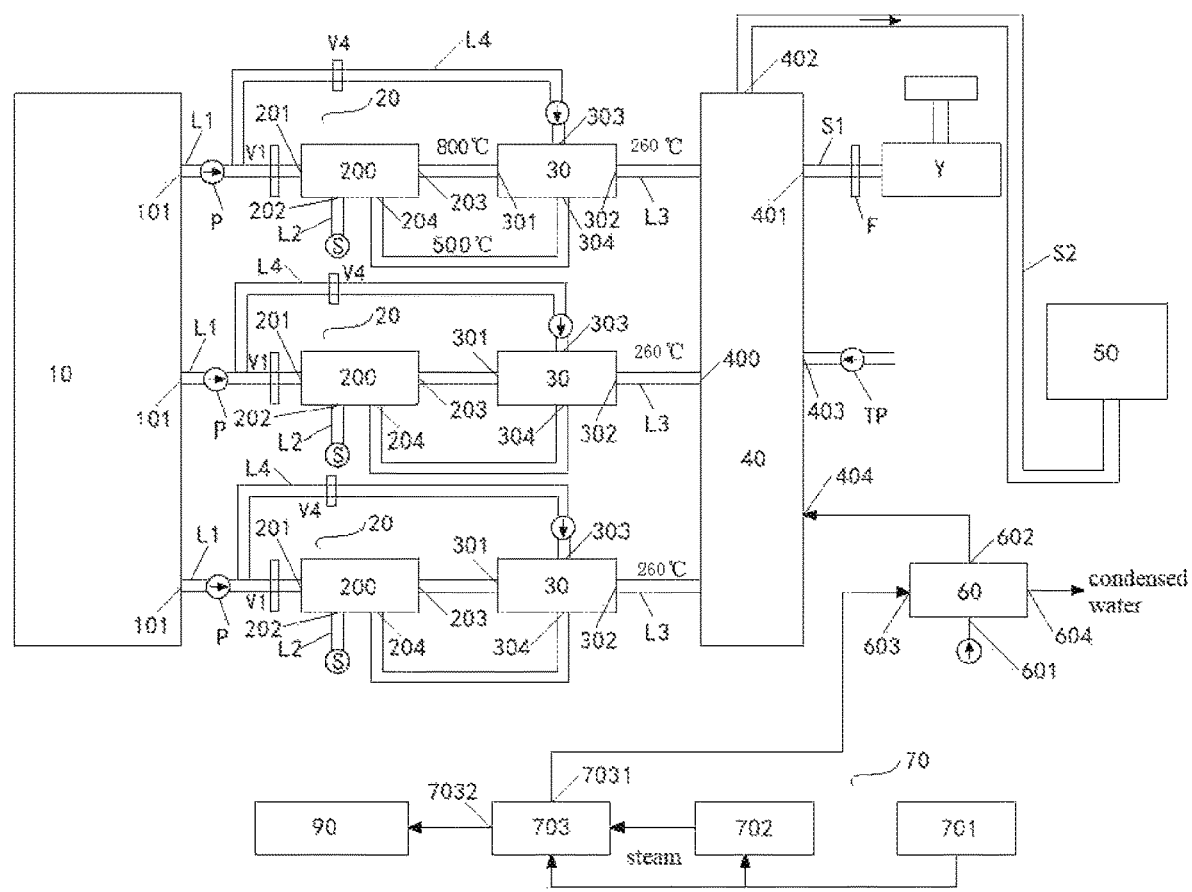
FIG. 3 is a structural schematic diagram of a second embodiment of the low nitrogen coupling combustion system for the disposal of waste stink gas and solid waste according to the present disclosure.

As another non-limiting embodiment, as shown in FIG. 3, the low nitrogen coupling combustion system for the disposal of waste stink gas and solid waste further includes a second heat exchanger 60. The second heat exchanger 60 includes a cold air inlet 601, a hot air outlet 602, a hot steam inlet 603, and a condenser water outlet 604. The hot air pipe 40 is provided with an air inlet 404 connected to the hot air outlet 602 of the second heat exchanger 60, and the hot steam inlet 603 of the second heat exchanger 60 is connected to a steam turbine steam discharge system 70 of a steam turbine to utilize the waste heat of the steam discharged from a steam-distributing cylinder 703 in the steam turbine steam discharge system 70 to preheat air. The preheated air then enters the hot air pipe 40 and mixes with the high temperature and low oxygen flue gas (exhaust gas), which can effectively recycle the waste heat discharged by the steam-distributing cylinder 703. The energy can be further recycled and utilized.

As shown in FIG. 3, the steam turbine steam discharge system 70 includes a steam turbine 701, a deaerator 702, and a steam-distributing cylinder 703 connected in sequence. The gas outlet 7031 of the steam-distributing cylinder 703 is connected to the hot steam inlet 603 of the second heat exchanger 60. Therefore, the steam of the steam turbine 701 passes through the deaerator 702 and then enters the steam-distributing cylinder 703, so that the waste heat discharged by the steam turbine steam discharge system 70 can be effectively recycled and utilized, and energy can be effectively saved. As a simplification, a discharge port of the steam turbine can be directly connected to the steam-distributing cylinder, omitting the step of removing oxygen. As a non-limiting embodiment, a first on-off valve (not shown) can be provided on a pipeline connecting the steam-distributing cylinder 703 and the steam turbine 701 adjacent to the steam-distributing cylinder 703. A second on-off valve (not shown) can be set on a pipeline connecting the deaerator 702 and the steam turbine 701 adjacent to the deaerator 702. When the deaerator 702 is required to work, the second on-off valve is opened and the first on-off valve is closed at the same time. When the deaerator 702 is not required to work, the first on-off valve is closed and the second on-off valve is opened.

In this non-limiting embodiment, the steam-distributing cylinder 703 may be provided with a branch outlet 7032, and the branch outlet 7032 is connected to the inlet (not shown in the drawings) of an absorption refrigeration system 90, so that part of the heat is used for refrigeration. The cooled air is used in production workshops and office areas. The outlet (not shown in the drawings) of the absorption refrigeration system 90 is connected to an inlet (not shown in the drawings) of the deaerator 702 through a condensate pipe Z2, so that the high-temperature condensate water formed after refrigeration is returned to the deaerator 702 through the condensate pipe Z2.

Figure 4:
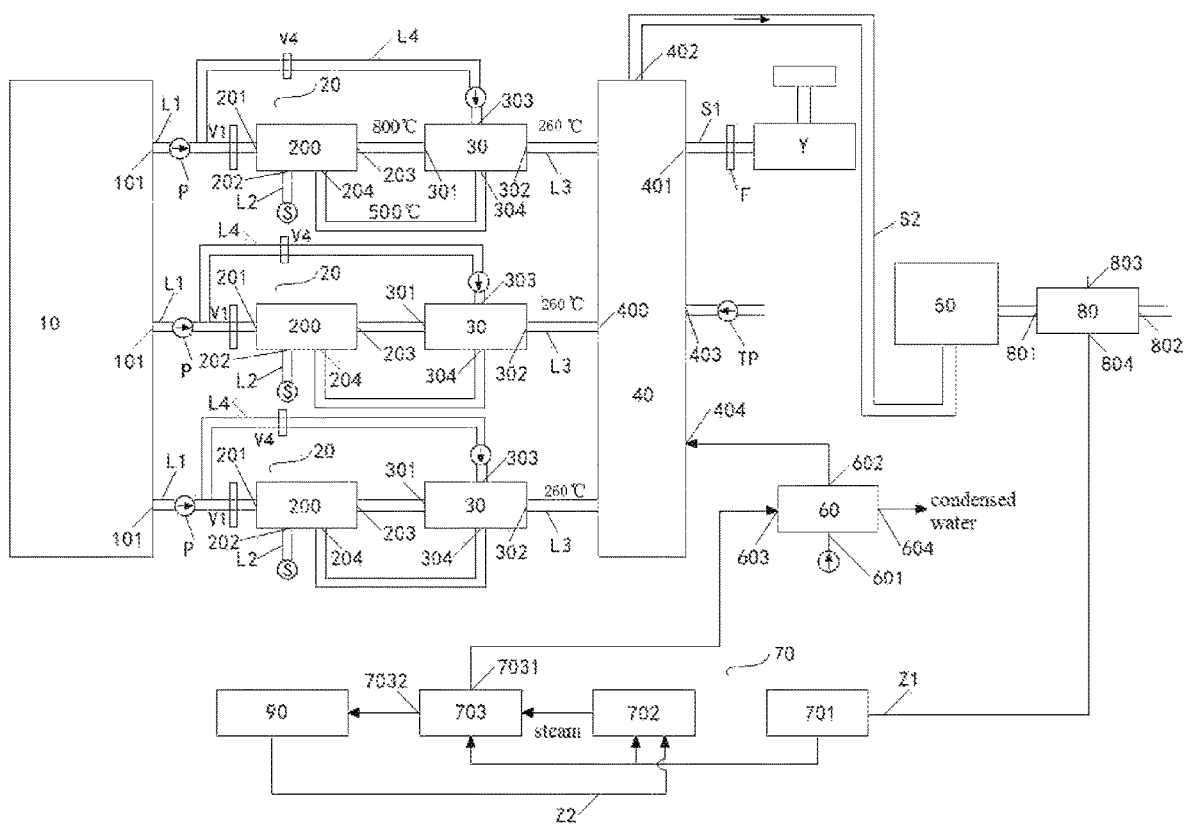
FIG. 4 is a structural schematic diagram of a third embodiment of the low nitrogen coupling combustion system for the disposal of waste stink gas and solid waste according to the present disclosure.

As another non-limiting embodiment, as shown in FIG. 4, the low nitrogen coupling combustion system for the disposal of waste stink gas and solid waste further includes a third heat exchanger 80. The third heat exchanger 80 includes a hot flue gas inlet 801, a cold flue gas outlet 802, a cold water inlet 803, and a steam outlet 804. The hot flue gas inlet 801 is connected to the flue gas outlet (not numbered) of the waste incinerator 50, the cold flue gas outlet 802 is connected to the chimney (not shown in the drawings), and the cold water inlet 803 is connected to a cold water source (not shown in the drawings), the steam outlet 804 is provided with a steam pipe Z1, and the steam pipe Z1 is connected to a steam inlet (not numbered) of the steam turbine 701 of the steam turbine steam discharge system 70, so that the steam heated by the heat generated by the waste incinerator 50 can be input the steam turbine to generate electricity, and the third heat exchanger 80 can be used to adjust the steam temperature and pressure of the steam turbine.

The above are only the preferred embodiments of the present disclosure and are not intended to limit the present disclosure. Any modification, equivalent replacement, improvement, etc. made within the spirit and principle of the present disclosure shall be included within protection scope of the present disclosure.

What is claimed is:

1. A low nitrogen coupling combustion system for the disposal of waste stink gas and solid waste, comprising a waste pit, at least one stink gas incineration equipment and a waste incinerator, wherein the waste pit is provided with stink gas outlets; and the stink gas incineration equipment is provided with an incineration chamber for burning stink gas, as well as a first stink gas inlet, a fuel inlet and a burned stink gas outlet which are connected with the incineration chamber; the first stink gas inlet is connected with the stink gas outlet of the waste pit through a stink gas delivery pipe, and the fuel inlet is connected with a fuel source through a fuel delivery pipe;
wherein, a hot air pipe is arranged between the stink gas incineration equipment and the waste incinerator, and the hot air pipe is provided with a gas inlet, a first exhaust outlet and a second exhaust outlet;
wherein, the gas inlet is connected with the stink gas incineration equipment;
the first exhaust outlet is connected with a chimney through a first exhaust pipe, and the first exhaust pipe is provided with a valve.

2. The low nitrogen coupling combustion system for the disposal of waste stink gas and solid waste of claim 1, wherein, the hot air pipe is provided with a regulating air inlet, and the regulating air inlet is connected with a fan.

3. The low nitrogen coupling combustion system for the disposal of waste stink gas and solid waste of claim 2, wherein, a first heat exchanger is arranged between the stink gas incineration equipment and the hot air pipe, the first heat exchanger is provided with a high-temperature gas inlet, a medium-temperature gas outlet, a second stink gas inlet and a stink gas discharge outlet; the stink gas incineration equipment is also provided with an inlet of stink gas branch pipe; the high-temperature gas inlet is connected with the burned stink gas outlet of the stink gas incineration equipment; the medium-temperature gas outlet is connected with the gas inlet of the hot air pipe; the second stink gas inlet is connected with the stink gas outlet of the waste pit through the stink gas branch pipe.

4. The low nitrogen coupling combustion system for the disposal of waste stink gas and solid waste of claim 3, wherein the number of the stink gas incineration equipment is at least two.

5. The low nitrogen coupling combustion system for the disposal of waste stink gas and solid waste of claim 4, wherein the number of the stink gas incineration equipment is three.

6. The low nitrogen coupling combustion system for the disposal of waste stink gas and solid waste of claim 1, further comprising a second heat exchanger; the second heat exchanger comprises a cold air inlet, a hot air outlet, a hot steam inlet, and a condensate water outlet;
the hot air pipe is provided with an air inlet, the air inlet is connected with the hot air outlet of the second heat exchanger, and the hot steam inlet of the second heat exchanger is connected with a steam turbine steam exhaust system.

7. The low nitrogen coupling combustion system for the disposal of waste stink gas and solid waste of claim 6, wherein, the steam turbine steam exhaust system comprises a steam turbine, a deaerator and a steam-distributing cylinder connected in sequence, and an outlet of the steam-distributing cylinder is connected with the hot steam inlet of the second heat exchanger.

8. The low nitrogen coupling combustion system for the disposal of waste stink gas and solid waste of claim 7, wherein, the steam-distributing cylinder is provided with a branch outlet; the branch outlet is connected with the inlet of an absorption refrigeration system; the outlet of the absorption refrigeration system is connected with the inlet of the deaerator through a condensate water pipe.

9. The low nitrogen coupling combustion system for the disposal of waste stink gas and solid waste of claim 2, further comprising a third heat exchanger; the third heat exchanger comprises a hot flue gas inlet, a cold flue gas outlet, a cold water inlet and a steam outlet; the hot flue gas inlet is connected with the steam outlet of the waste incinerator; the cold flue gas outlet is connected with the chimney; the cold water inlet is connected with a cold water source; a steam pipe is arranged at the steam outlet; the steam outlet is connected with the hot steam inlet of the steam turbine of the steam turbine steam exhaust system through a steam pipe.

* * * * *